(12) United States Patent
Ross

(10) Patent No.: US 7,155,582 B2
(45) Date of Patent: Dec. 26, 2006

(54) DYNAMIC REORDERING OF MEMORY REQUESTS

(75) Inventor: David Charles Ross, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 10/779,705

(22) Filed: Feb. 18, 2004

(65) Prior Publication Data

US 2004/0199729 A1    Oct. 7, 2004

(30) Foreign Application Priority Data

Feb. 19, 2003    (AU) .............................. 2003900733

(51) Int. Cl.
*G06F 12/00*    (2006.01)
(52) U.S. Cl. .................. 711/158; 711/151; 711/206; 710/36
(58) Field of Classification Search ................ 711/151, 711/158, 167–169, 202–208, 216; 710/36, 710/61; 712/205, 245–248
See application file for complete search history.

(56) References Cited

U.S. PATENT DOCUMENTS

| 6,212,611 B1 | 4/2001 | Nizar et al. ................. 711/169 |
| 6,510,474 B1 | 1/2003 | Stracovsky et al. ........... 710/58 |
| 6,580,712 B1 * | 6/2003 | Jennings et al. ............ 370/392 |

* cited by examiner

*Primary Examiner*—Nasser Moazzami
(74) *Attorney, Agent, or Firm*—Fitzpatrick, Cella, Harper & Scinto

(57) ABSTRACT

An arbitrator (24) is disclosed for reordering access requests (25) to a memory system (150) to reduce memory system conflicts. The arbitrator comprises a transaction buffer (203) for buffering the access requests (25), an output counter (207) for counting access requests issued by the arbitrator (24), a mapping table (211) for mapping at least the output counter (207) to the access requests (25) in the transaction buffer (203), and a reordering unit (225) for dynamically re-ordering entries in the mapping table (211) such that the mapping points to the access requests (25) in an issue order wherein memory system conflicts are reduced.

8 Claims, 12 Drawing Sheets

DYNAMIC REORDERING OF MEMORY REQUESTS

TECHNICAL FIELD OF THE INVENTION

The present invention relates generally to a system containing several data-processing units and, in particular, to a system containing several vector-processing units accessing a shared memory sub-system.

BACKGROUND ART

A vector here is defined as an ordered list of scalar values. A simple vector in a computer's memory is defined as having a starting address, a length (number of elements), and a stride (constant distance in memory between elements). For example, an array stored in memory is a vector. Vector processors process vector instructions that fetch a vector of values from a memory sub-system, operate on them and store them back to the memory sub-system. Basically, vector processing is the Single Instruction Multiple Data (SIMD) parallel processing technique known in the art. On the other hand, scalar processing requires one instruction to act on each data value.

Vector processor performance is strongly dependent on occurrences of resource conflicts within the memory sub-system that the vector processor accesses. These conflicts render a portion of the peak memory bandwidth unusable and inaccessible to the system containing the vector processor as a whole. Such resource conflicts also increase the average memory access latency of the memory sub-system. In systems where multiple vectors are simultaneously active, conflicts can occur between accesses to the same vector, known as intra-vector conflicts, or between accesses to different vectors, known as inter-vector conflicts.

The causes of memory sub-system resource conflicts are numerous. However, they relate in particular to the use of interleaved memory sub-systems and/or to the use of memory components with heterogeneous architectures. Modern Dynamic Random Access Memory (DRAM) technology, for example, is typically organised hierarchically into banks and pages. The order in which these partitions of the memory array within the memory component are activated, significantly influences the performance of the memory component. In addition to the hierarchical structuring of these devices, some technologies such as RAM-BUS™ Direct Random Access Memory (RDRAM™) and Double Data Rate Synchronous Dynamic Random Access Memory (DDR SDRAM) etc support bank or page interleaving. This feature facilitates a pipelined approach to memory access whereby transactions can be issued at a rate not limited by the latency of the memory sub-system so long as certain requirements are met.

There are two traditional approaches to optimising memory sub-system performance. These are commonly applied according to two possible access policies namely the open-page policy and the closed page policy.

Open-page Policy

Once a page has been opened for access, subsequent accesses to that page can be performed with relatively low latency. In the open page policy case, a conflict is defined as a page-crossing event. When this happens, several extra cycles are required to restore the current open page back to the DRAM core and extract (or open) the page containing the next requested data. When repeated accesses to the same page can be sustained, transactions can be issued at an increased rate, but that rate remains a fraction of the system clock frequency. This is because, even in this low latency mode of operation, several cycles are required to complete each transaction. Furthermore, since interleaving is not possible, each transaction must complete before the next is issued. The peak transaction rate of the memory system is limited by the lowest latency mode of operation and is achieved by repeatedly accessing the same page of memory.

The most commonly used approach to exploiting this mode of operation is to burst access each vector. In effect, data that are anticipated to be required in subsequent computations are pre-fetched.

This approach suffers from a number of drawbacks including:

The maximum transaction rate remains relatively low in comparison to the clock frequency;

Relatively large caches are required to buffer the burst data close to the data processing units. In this context, the term data refers to either instructions fetched or operands of said instructions; and Data-dependencies in the memory access pattern may invalidate pre-fetched data requiring repeated fetches to acquire the correct data.

Closed-Page Policy

As an alternative to the open-page policy, a closed page policy can be used, especially when the memory sub-system has an interleaved architecture. So long as transactions are issued according to the requirements of the interleaved memory system, they can be issued every clock cycle. For example, the memory system may have a minimum latency of four cycles and a four-fold interleaved architecture. In this case, to maximise transaction issue rate, no single sub-unit of the memory system may be accessed more frequently than once in every four clock cycles. When this is achieved, the peak transaction rate is not limited by memory sub-system latency; instead, it is limited only by the system clock frequency. In this context, a sub-unit of memory refers to the level of hierarchy in the memory sub-system at which interleaving applies. A closed page policy conflict is defined as a failure to maintain the access frequency to an interleaved sub-unit of memory below the maximum operating frequency of that sub-unit. These requirements are met by avoiding repeated accesses to the same sub-unit of memory and revisiting the sub-unit at a maximum frequency defined as the reciprocal of the memory sub-system latency.

One method that is commonly used in an attempt to reduce conflict frequency in interleaved memories is address re-mapping. This technique assumes that each stream is accessed in a linear fashion, usually with a stride of 1. If the assumption holds, then swapping bits of the address bus appropriately ensures that vector accesses are always conflict-free. Effectively, address re-mapping ensures that the vector is distributed across the memory sub-system in a way that meets the requirements of the interleaving. Address re-mapping is applied statically in general, but could be applied dynamically, in principle.

There are several deficiencies in this approach including:

The technique can only help to reduce intra-vector conflicts;

Statistically, it cannot improve inter-vector conflict frequency;

In light of the first two points, address re-mapping is really only effective in a burst-oriented pre-fetch mode of operation as in open page policy. Therefore, as in the case of open page policy, relatively large caches are required close to the processing units, and data-dependencies in access patterns may invalidate some pre-fetches; and Vectors are not always accessed with a stride of 1. Often the access pattern does not resemble any well-defined stride that could be rendered conflict-free by address re-mapping.

SUMMARY OF THE INVENTION

It is an object of the present invention to substantially overcome, or at least ameliorate, one or more disadvantages of existing arrangements. According to a first aspect of the invention, there is provided an arbitrator for reordering access requests to a memory system to reduce memory system conflicts, said arbitrator comprises:

a transaction buffer for buffering said access requests;

an output counter for counting access requests issued by said arbitrator;

a mapping table for mapping at least said output counter to said access requests in said transaction buffer; and a reordering unit for dynamically re-ordering entries in said mapping table such that said mapping points to said access requests in an issue order wherein memory system conflicts are reduced.

According to a second aspect of the invention, there is provided an arbitration method of reordering access requests to a memory system to reduce memory system conflicts, said method comprising:

(a) buffering said access requests in a transaction buffer;

(b) maintaining a mapping table, said mapping table mapping at least an output counter to said access requests in said transaction buffer; and (c) dynamically re-ordering entries in said mapping table such that said mapping points to said access requests in an issue order wherein memory system conflicts are reduced.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
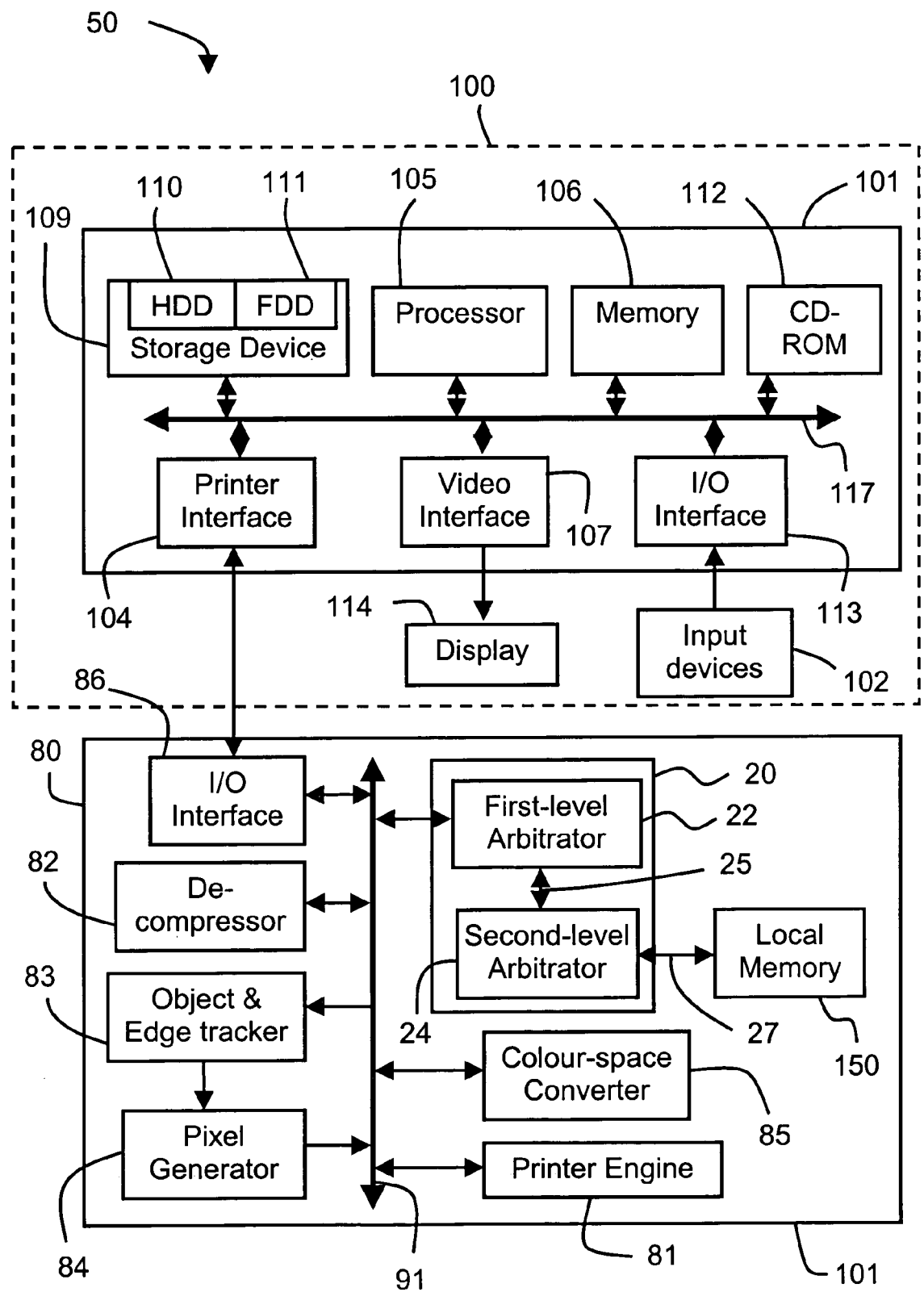
FIG. 1 shows a schematic block diagram of printer system including a host computer and a printer device.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic block diagram of printer system 50 including a host computer 100 and a printer device 80. The host computer 100 includes a computer module 101, input devices 102 and a display device 114. The computer module 101 typically includes at least one processor unit 105, a memory unit 106, for example formed from semiconductor random access memory (RAM) and read only memory (ROM), input/output (I/O) interfaces including a video interface 107, an I/O interface 113 for the input devices 102, and a printer interface 104 for the printer device 80. A storage device 109 is provided and typically includes a hard disk drive 110 and a floppy disk drive 111. A CD-ROM drive 112 is typically provided as a non-volatile source of data. The components 104 to 113 of the computer module 101, typically communicate via the interconnected bus 117 and in a manner which results in a conventional mode of operation of the computer system 100 known to those in the relevant art.

An application executed on the processor 105 of the host computer 100 converts image data from, for example, a graphics device interface (GDI) format, which is displayable on the display device 114, to an object graphics format before sending the image data to the printer device 80 via the printer interface 104 for printing.

The printer device 80 includes an I/O interface 86, a print engine 81, a plurality of vector-processors 82 to 85, a memory interface 20 and a local memory 150. The I/O interface 86, the print engine 81, the vector-processors 82 to 85, and the memory interface 20 communicate via a communication bus 91 in a manner known in the art. The local memory 150 is interfaced with the memory interface 20.

The I/O interface 86 interfaces the printer device 80 to the host computer 100 through the printer interface 104. Image data received by the I/O interface 86 from the host computer 100 is passed to the local memory 150, via the memory interface 20, where it is stored before further processing.

The vector-processors 82 to 85 include a de-compressor 82 which reads compressed image data from the local memory 150, converts the compressed image data to image data in the object graphics format, and passes the image data back to the local memory 150 for storing.

The vector-processors 82 to 85 further include an object and edge tracker 83 and a pixel generator 84. The object and edge tracker 83 analyses image data stored in the local memory 150 in the object graphics format to determine an order of layered image objects to be printed. This is required to determine the properties of pixels in a raster order. A pixel generator 84 then receives the order of the image objects from the object and edge tracker 83, formats the pixel data for each pixel in sequence, and passes the pixel data to the local memory 150 for storing.

The vector-processors 82 to 85 further include a colour space converter 85 which accesses the pixel data and converts the pixel data to a printer colour space, such as CMYK. The pixel data in the printer colour space is passed back to the local memory 150 for storing.

Consequently, the I/O interface 86, the printer engine 81 and the plurality of vector-processors 82 to 85 collectively give rise to a source of transaction requests to form several transaction streams. Each data processing unit 81 to 86 may access one or more vectors in the local memory 150 through the memory interface 20.

The memory interface 20 includes a first level arbitrator 22 and a second level arbitrator 24. The data processing units 81 to 86 concurrently place demand for memory access on the first-level arbitrator 22. The first level arbitrator 22 receives as input the multiple transaction requests from the data processing units 81 to 86, where each request is associated with a transaction to/from a discrete vector in the local memory 150, and interleaves the discrete transaction-streams into a single composite transaction stream 25 to the second level arbitrator 24 according to the rules of the arbitration algorithm used. The arbitration performed by the first level arbitrator 22 is concerned with distributing memory bandwidth amongst the data processing units 81 to 86 so as to ensure that all data processing units 81 to 86 are kept active. The first-level arbitration algorithm may, for example, apply round-robin style arbitration to those transaction requests from the data processing units 81 to 86.

The single composite data-stream 25 may be passed to memory, such as local memory 150. However the single composite data-stream 25 formed by the first level arbitrator 22 is not optimised with respect to the requirements of the memory sub-system and may result in multiple resource conflict events within the memory sub-system.

Accordingly, the second level arbitrator 24 provides a transaction interface between the first level arbitrator 22 and the local memory 150, for processing the composite datastream 25 formed by the first level arbitrator 22 by applying a second arbitration algorithm to produce a single composite transaction-stream 27 with optimised inter-vector interleaving.

Figure 2:
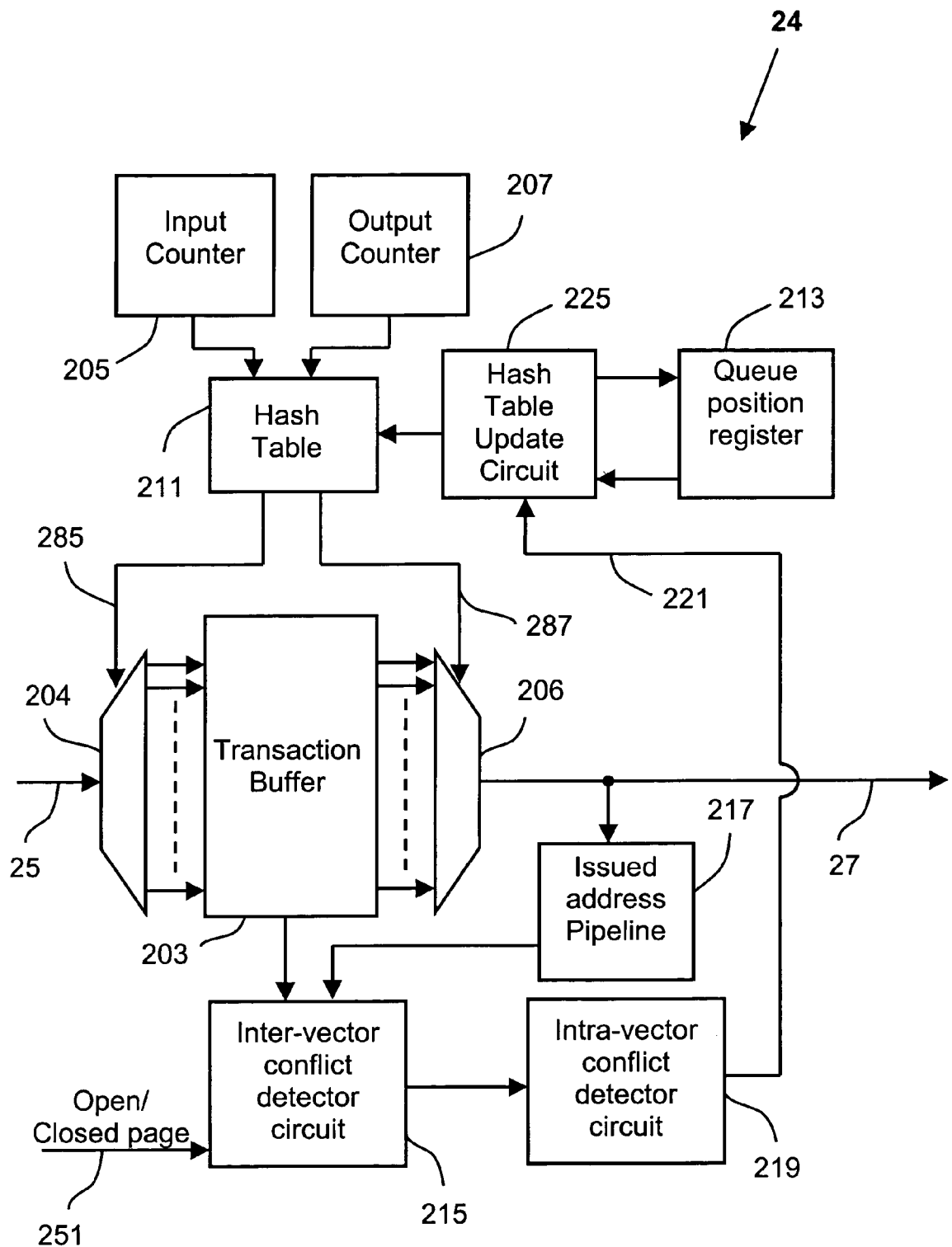
FIG. 2 shows a block diagram of a second-level arbitrator.

FIG. 2 shows a block diagram of the second-level arbitrator 24 in more detail. Central to the operation of the second-level arbitrator 24 is a transaction buffer 203, which holds N transaction entries. The transactions on the composite transaction stream 25 (the incoming stream) received from the first-level arbitrator 22 (FIG. 1) is buffered in the transaction buffer 203 before being issued to the re-ordered transaction stream 27 (the re-ordered outgoing stream) in an order that reduces conflict to the local memory 150 (FIG. 1).

The transaction buffer 203 is indexed by two modulo-16 counters, namely an input counter 205 and an output counter 207. However, the counters 205 and 207 do not index the transaction buffer 203 directly. Instead, the counters 205 and 207 index a mapping table in the form of a hash table 211, which generates a write pointer 285 and a read pointer 287 from the input counter 205 and output counter 207 respectively. The input counter 205 is incremented whenever a transaction is loaded into the buffer 203, while the output counter 207 is updated whenever a transaction is issued from the buffer 203 onto the re-ordered transaction stream 27.

The input counter 205, through the hash table 211, indexes the transaction buffer 203 by operating on demultiplexer 204, which loads the next transaction received on the composite transaction stream 25 into the buffer 203 at the buffer location pointed to by the write pointer 285. Similarly, the output counter 207, also through the hash table 211, indexes the transaction buffer 203 by operating on multiplexer 206, which selects the transaction pointed to by the read pointer 287 in the transaction buffer 203 to be the next transaction issued on the re-ordered transaction stream 27. The order in which the read pointer 287 points to the transactions in the transaction buffer 203 is an order that reduces conflict to the local memory 150 (FIG. 1).

From the above it can be seen that the hash table 211 performs two functions. Firstly, it maps the input counter 205 to buffer locations in the transaction buffer 203 as they were vacated in second-level arbitration-order, allowing those buffer locations to be filled with new transactions. Secondly, the hash table 211 maps the output counter 207 to a sequence of buffer locations in the transaction buffer 203 containing minimum occurrences of memory resource conflicts. The hash table 211 is updated whenever the second-level arbitrator 24 reorders the outgoing stream to avoid a resource conflict.

The resource conflicts are detected by an inter-vector conflict detector circuit 215 and an intra-vector conflict detector circuit 219. An issued address pipeline 217 is also provided which stores the addresses of a last number of transactions issued on the composite transaction stream 27.

The inter-vector conflict detector circuit 215 compares the address of each transaction B(n) buffered in the transaction buffer 203 with the issued addresses stored in the issued address pipeline 217, and determines which of those transactions B(n) conflict with the issued addresses stored in the issued address pipeline 217. In doing so, the inter-vector conflict detector circuit 215 masks out all address bits not defining the sub-unit of memory of the address, and determines whether the address of transaction B(n) is in the same sub-unit of memory as the addresses of one or more previous issued addresses stored in the issued address pipeline 217.

Figure 3:
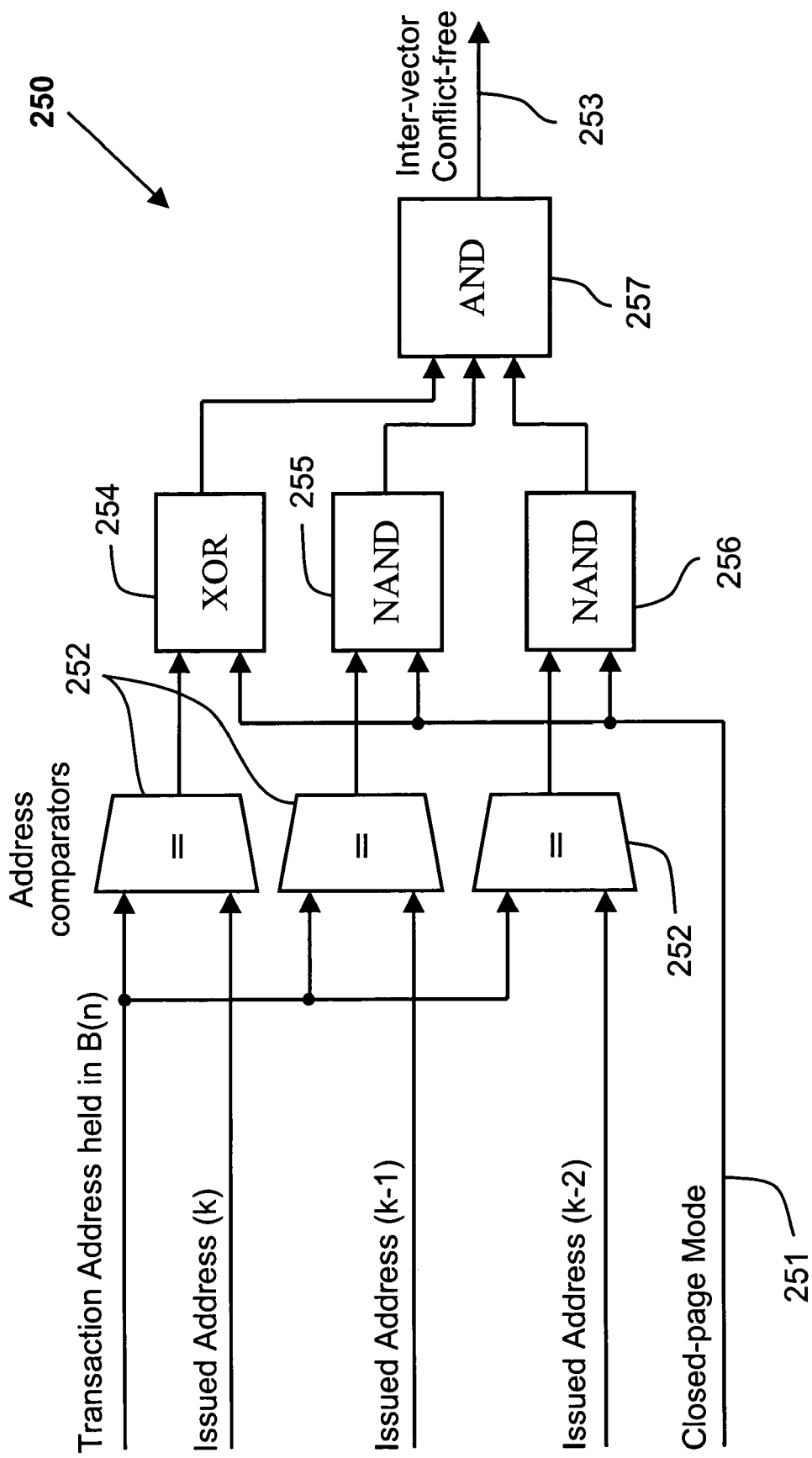
FIG. 3 shows a block diagram of an inter-vector conflict detector sub-circuit with a four-fold interleaved architecture.

An inter-vector conflict detector sub-circuit 250 with a four-fold interleaved architecture is shown in more detail in FIG. 3. The inter-vector conflict detector circuit 215 (FIG. 2) comprises N such sub-circuits 250. Each inter-vector conflict detector sub-circuit 250 compares the address of the transaction B(n) in one buffer address of the transaction buffer 203 with the issued addresses stored in the issued address pipeline 217.

The inter-vector conflict detector sub-circuit 250 with four-fold interleaved architecture includes three address comparators 252. Each address comparator 252 compares the address of transaction B(n) with one issued addresses stored in the issued address pipeline 217. The inter-vector conflict detector sub-circuit 250, and hence the inter-vector conflict detector circuit 215, allows the second-level arbitrator 24 to embody the rules of both the closed and open-page modes of memory operation. Either mode may be selected to suit the type of memory technology deployed by setting a closed-page mode flag 251 to a value of '1' when the closed-page mode is desired. In closed page mode, that is when the closed-page mode flag 251 is set to '1', if the address of transaction B(n) is in the same sub-unit of memory as the addresses of any one of the previous three issued addresses then, through the operation of logic elements 254 to 257, an inter-vector conflict-free flag 253 is set to '0' indicating that a conflict has been detected. Alternatively, the inter-vector conflict-free flag 253 is set to '1' indicating that there is no closed-page mode conflict, as the address of transaction B(n) is in a different sub-unit of memory than the addresses of each of the previous three issued transactions.

In open-page mode, that is when the closed-page mode flag 251 is set to a value of '0', the inter-vector conflict detector sub-circuit 250 detects whether the address of transaction B(n) is in the same sub-unit of memory as the address of the previous issued address only. If the address of transaction B(n) is in the same sub-unit of memory as the address of the previous issued transaction, then the inter-vector conflict-free flag 253 is set to a value of '1'. Alternatively the inter-vector conflict-free flag 253 is set to a value '0', indicating that the address of transaction B(n) is in a different sub-unit of memory than the address of the previous issued transaction.

Referring again to FIG. 2, after the inter-vector conflict-free status of each transaction B(n) in the transaction buffer 203 is determined by the inter-vector conflict detector circuit 215, an intra-vector conflict detector circuit 219 determines which of the transactions B(n) that has no inter-vector conflicts, also has no intra-vector conflicts, thereby preserving the temporal ordering in intra-stream requests. The operation of the intra-vector conflict detector circuit 219 is described in more detail below.

A hash table update circuit 225 uses the conflict status of each of the transactions B(n) received from the intra-vector conflict detector circuit 219 to update the hash table 211 and a queue position register 213. In particular, the hash table update circuit 225 uses a content addressable memory to firstly determine the locations within the queue position register 213 that point to entries in the transaction buffer 203 containing transactions that are conflict free. For example, if the transaction in buffer location 8 is conflict free, and the value 8 is in entry 4 of the queue position register 213, then the location 4 is returned by the content addressable memory.

Next, from those locations returned by the content addressable memory the hash table update circuit 225 determines the lowest location. The value in that location then points to the location in the transaction buffer 203 containing the next conflict-free transaction. In the case where the inter-vector conflict detector circuit 215 and the intra-vector conflict detector circuit 219 determine that no conflict-free transactions exist, then the value 0 is returned by the content addressable memory.

A value returned by the content addressable memory of greater than 0 indicates that the order the transactions are issued may be altered to avoid conflicts. In this case the hash table update circuit 225 updates the hash table 211 by moving the entry which points to the location of the next conflict-free transaction to the entry pointed to by the output counter. At the same time, the entries of the hash table 211 located from the entry pointed to by the output counter to the entry below the entry which points to the location of the next conflict-free transaction are moved up by one entry. The hash table 211 is circular, resulting in 'wrap-around' when entries are moved past the boundaries of the hash table 211. From the above it can be seen that the hash table 211 is updated whenever the second-level arbitrator 24 (FIG. 2) reorders the outgoing stream to avoid a resource conflict.

The queue position register 213 is updated by the hash table update circuit 225 whenever a transaction is issued on the re-ordered transaction stream 27. In particular, the queue position register 213 is updated by pushing the value in the position of the queue position register 213 corresponding to the position of the issued transaction to the back of the queue position register 213, while the entries above the vacated position advances a single position forward.

Figure 4A:
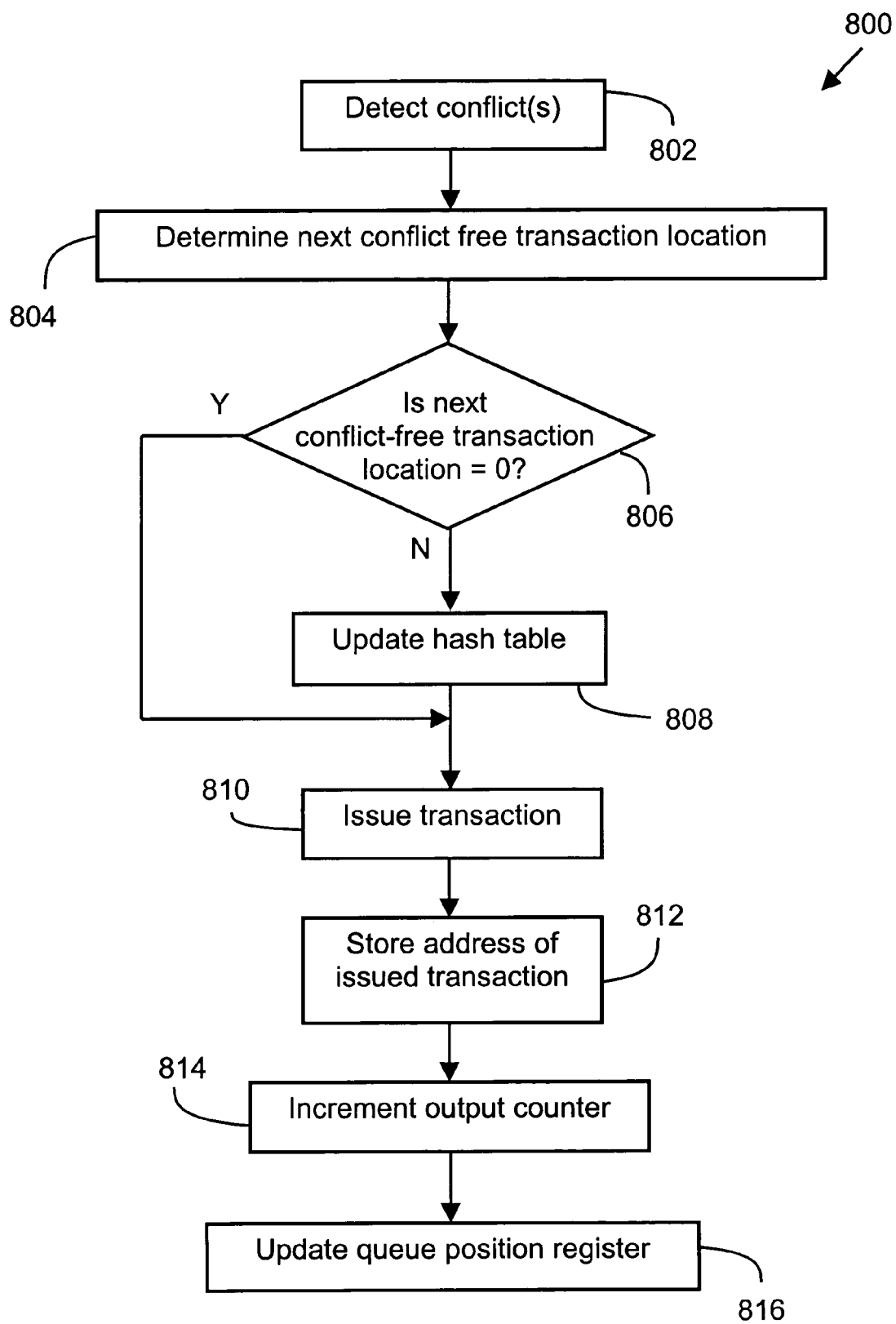
FIG. 4A shows a flow diagram of the operation of the second-level arbitrator when issuing a transaction.
Figure 4B:
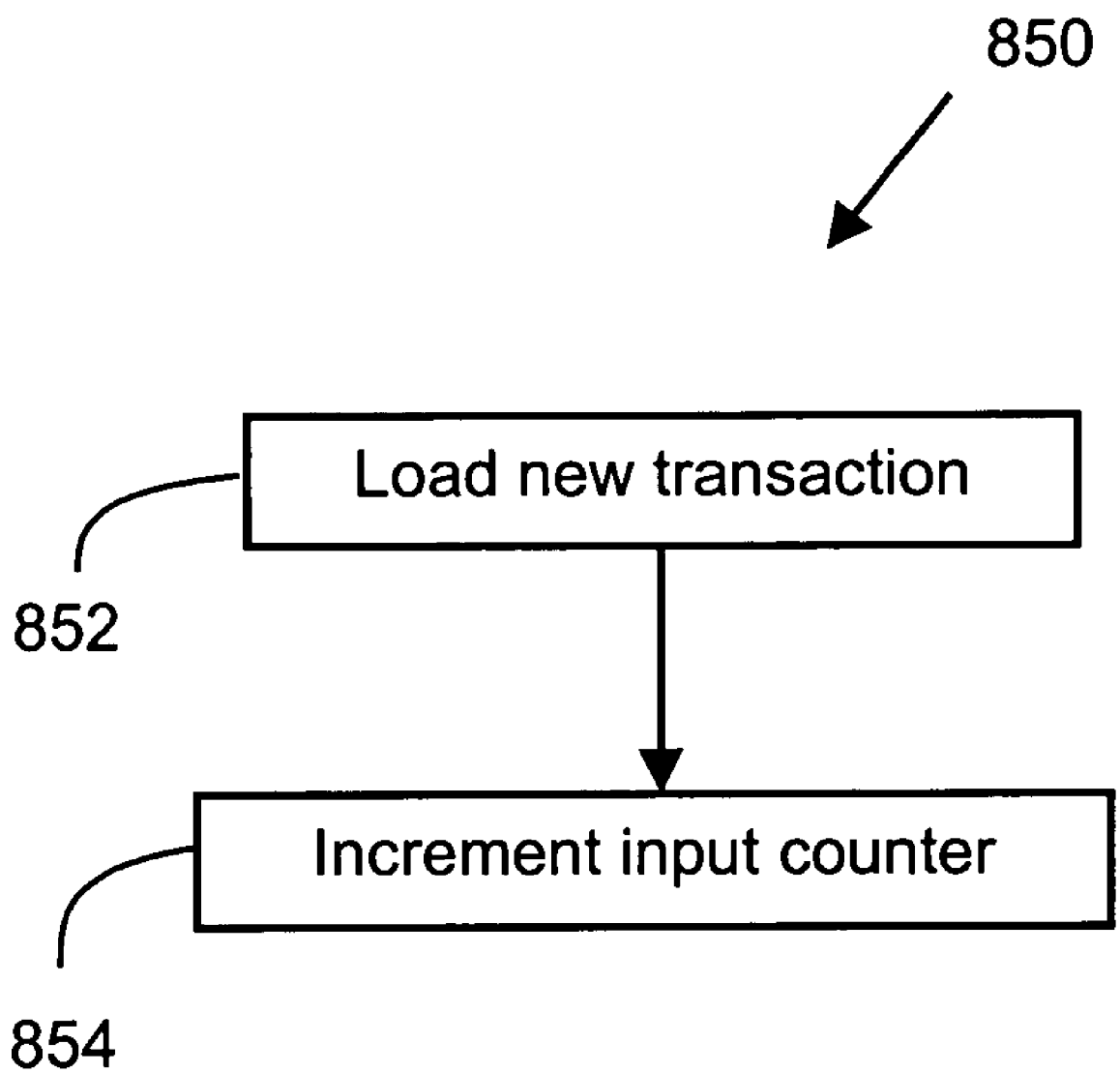
FIG. 4B shows a flow diagram of the operation of the second-level arbitrator when loading a newly received transaction.

FIGS. 4A and 4B are flow diagrams describing the operation of the second-level arbitrator 24. In particular, FIG. 4A is a flow diagram of a method 800 used by the second-level arbitrator 24 when issuing a transaction onto the re-ordered transaction stream 27, whereas FIG. 4B is a flow diagram of a method 850 used by the second-level arbitrator 24 when loading a new transaction into the transaction buffer 203.

Figure 5A:
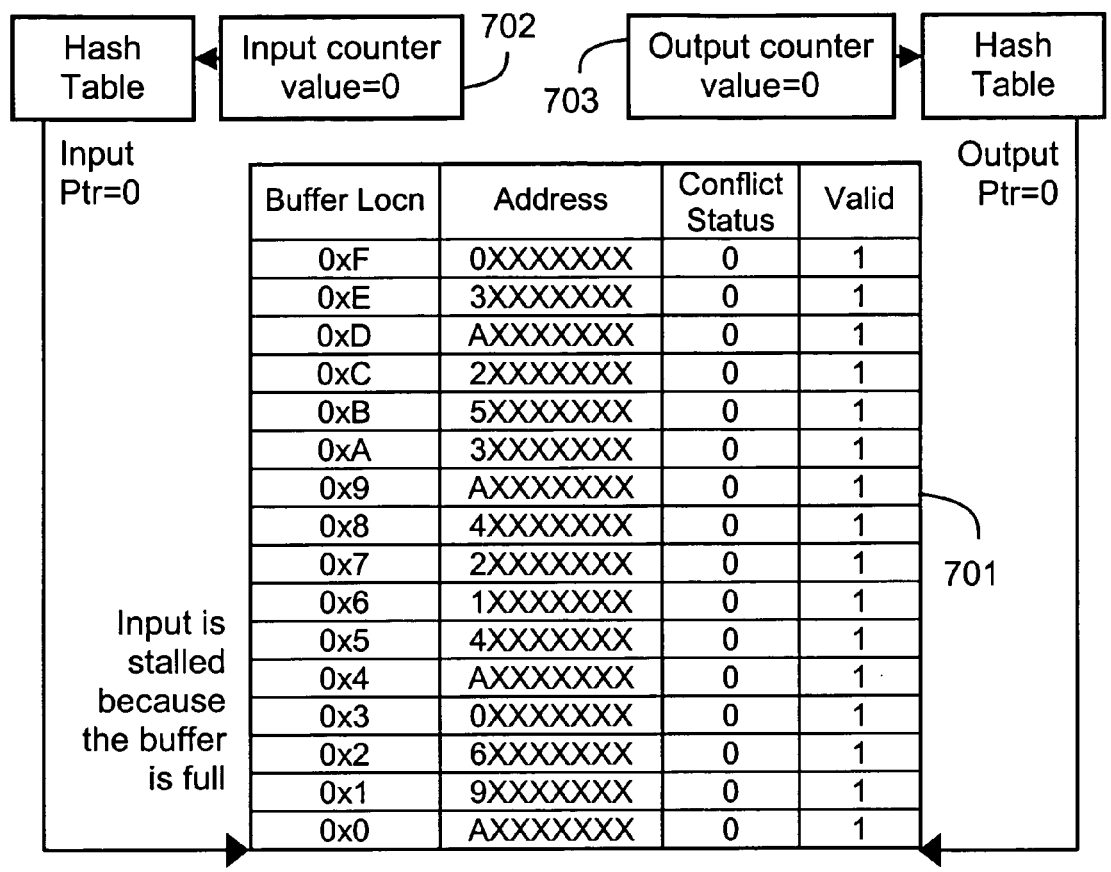
FIGS. 5A to 5F illustrate the operation of the second-level arbitrator circuit in open-page mode by way of an example.
Figure 5A:
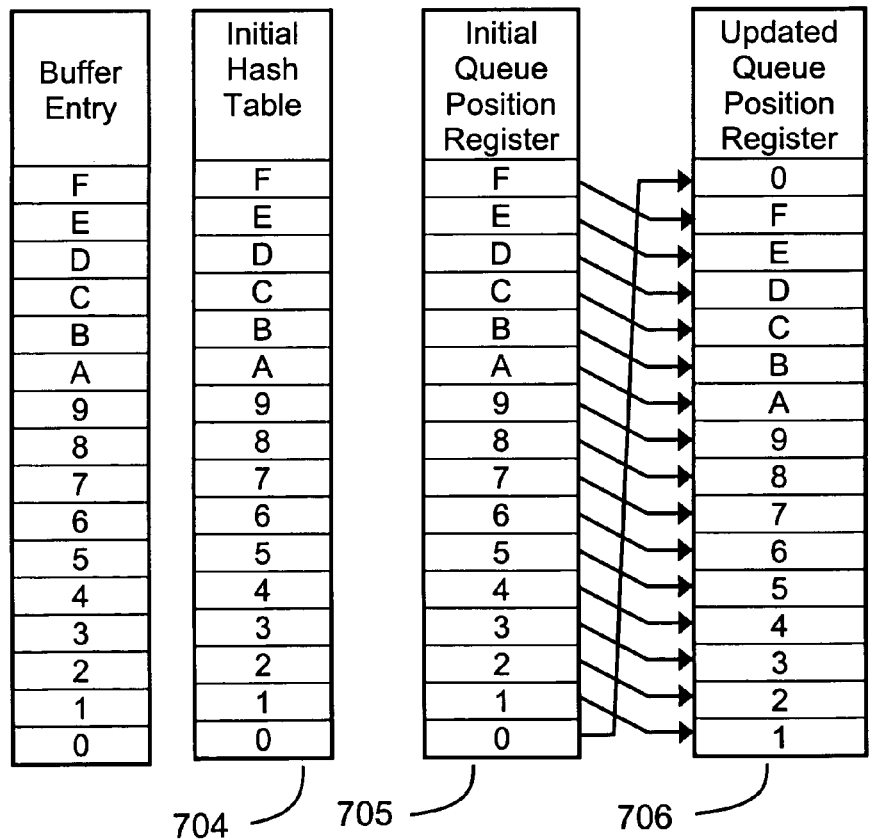

Methods 800 and 850 are described with reference to FIGS. 5A to 5F where an example of an open-page mode operation is depicted. FIG. 5A depicts a scenario following initiation of the second-level arbitrator 24 where the transaction buffer 203 (FIG. 2) has been loaded with the first 16 pending transactions from the composite transaction stream 25. The values of the input counter 702 and the output counter 703 are both 0. Table 701 shows the addresses of the transactions loaded into the buffer locations of the transaction buffer 203. Tables 704 and 705 show the (initial) values in the hash table 211 (FIG. 2) and queue position register 213 (FIG. 2) respectively. The hash table 211 shown in table 704 holds a direct mapping of counter values to buffer locations. The queue position register 213 shown in table 705 holds the order in which the transactions were loaded into the transaction buffer 203, that is location 0x0 was filled first, followed by location 0x1 etc. The input to the transaction buffer 203 is stalled because all the buffer locations are currently filled.

Referring also now to method 800 (FIG. 4A) used by the second-level arbitrator 24 when issuing a transaction on the re-ordered transaction stream 27. Method 800 starts in step 802 where the inter-vector conflict detector circuit 215 (FIG. 2) compares the addresses of the transactions buffered in the transaction buffer 203 with the last issued addresses stored in the issued address pipeline 217. Because no transactions have been issued yet, thus no page is open yet, the issued address pipeline 217 is empty. Hence, the inter-vector conflict detector circuit 215 determines that all the transactions are conflict-free. Table 701 also shows the conflict status of each of the valid (or pending) transactions in the transaction buffer 203. It is noted that the next transaction in the transaction buffer 203, which is at buffer location 0x0, is conflict free.

In step 804 the hash table update circuit 225 (FIG. 2) uses the conflict status of each of the transactions to determine the locations within the queue position register 213 that point to entries in the transaction buffer 203 containing transactions that are conflict free. In the example, all the transactions in table 701 are conflict free, and all the locations of the queue position register 213, which is illustrated in table 705, are returned as containing pointers to buffer locations holding conflict free transactions. The smallest location is selected, which is in entry 0 of the initial queue position register (table 705).

In step 806 the second-level arbitrator 24 determines whether the smallest location determined in step 804 is 0. A smallest location of 0 indicates that either no conflict-free transactions exist, or that the next transaction, that is the transaction in the location pointed to by the entry in the front of the queue position register 213, is conflict free. In this case the interval is 0 because the next transaction is conflict-free. No re-ordering is required and the method 800 continues to step 810.

In step 810 the next transaction indexed by the output counter 207 is issued to the local memory 150 (FIG. 1). As the value of the output counter 703 is 0, the corresponding entry in the hash table 704 is also 0. Accordingly, the transaction issued to the local memory 150 is that in buffer location 0x0. The address of that transaction, which is AXXXXXXX, is also stored in the issue address pipeline 217 (FIG. 2) in step 812.

This transaction issue event increments the output counter 207 in step 814 to a value of 1 in the example. Step 816 follows where the queue position register 213 is updated by pushing the value in the position of the queue position register 213 corresponding to the position of the issued transaction to the back of the queue position register 213, while the entries above the vacated position advances a single position forward. Table 706 shows the updated values in the queue position register 213.

Figure 5B:
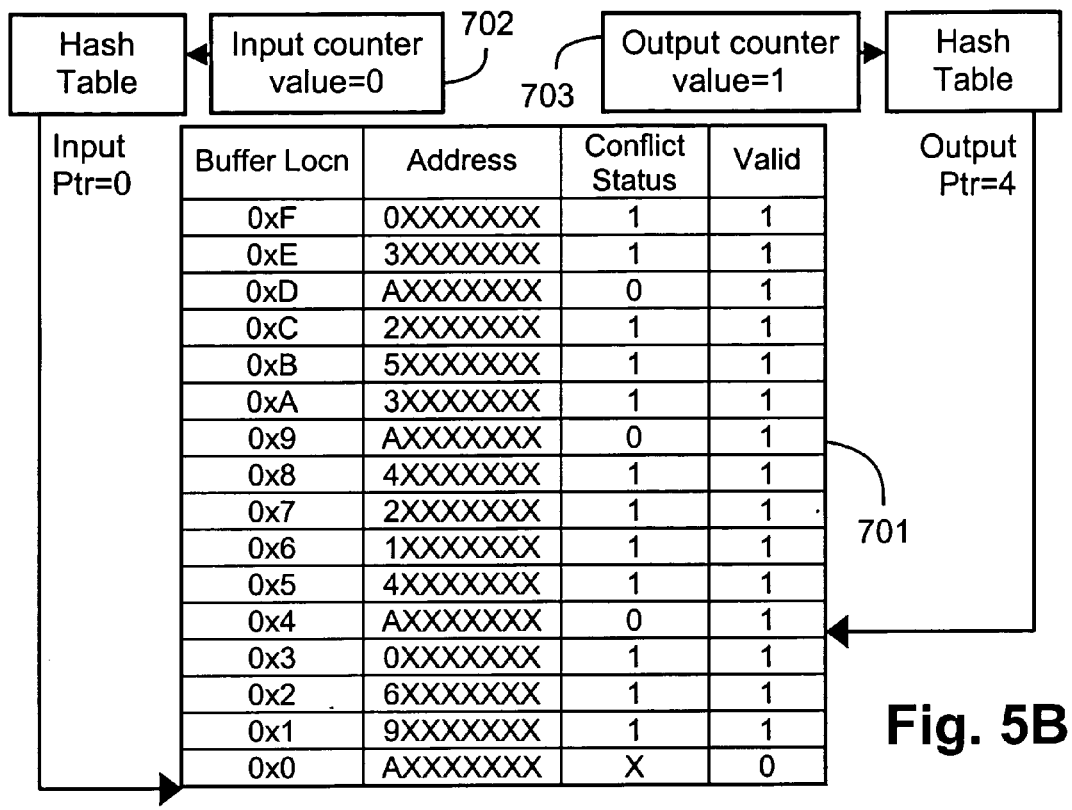
Figure 5B:
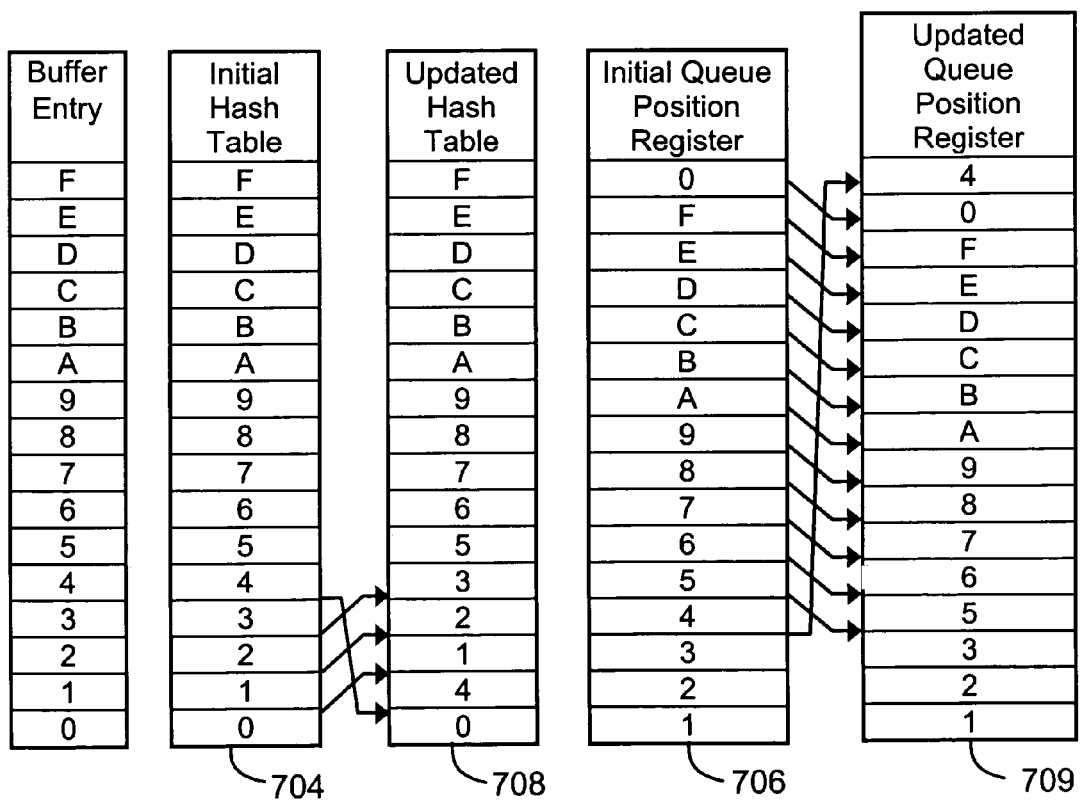

FIG. 5B depicts a scenario where another transaction is issued onto the re-ordered transaction stream 27. Accordingly, method 800 is again invoked by the second-level arbitrator 24. Starting again in step 802, the inter-vector conflict detector circuit 215 compares the addresses of the transactions buffered in the transaction buffer 203 with the last issued addresses stored in the issued address pipeline 217, which is AXXXXXXX. Table 701 shows the conflict status of each of the pending transactions in the transaction buffer 203. It is noted that the next transaction in the transaction buffer 203, which is at buffer location 0x1, is not conflict free.

In step 804 the hash table update circuit 225 (FIG. 2) uses the conflict status of each of the transactions to determine the locations within the queue position register 213 that point to entries in the transaction buffer 203 containing transactions that are conflict free. In the example, buffer locations 0x4, 0x9 and 0xD contain transactions that are conflict-free. As the entries 0x4, 0x9 and 0xD occupy entries 3, 8 and C respectively in the queue position register (table 706), the hash table update circuit 225 determines that entry 0x4, which occupies entry 3 in the queue position register (table 706), occupies the lowest entry in the queue position register.

In step 806 the second-level arbitrator 24 determines whether the lowest entry determined in step 804 is 0. As the lowest location is entry 3 in the example, which indicates that the order of the transactions can be reordered to avoid a memory resource conflict, the method 800 continues to step 808 where the hash table 211 is updated by the hash table update circuit 225. In the example, the initial hash table 704 is updated to form the updated hash table 708 by moving the entry which points to the location of the next conflict-free transaction, which is entry 4, to the entry pointed to by the output counter, which is entry 1. At the same time the entries of the hash table located from the entry pointed to by the output counter to the entry below the entry which points to the location of the next conflict-free transaction up by one entry. In the example the entries of the hash table located from entry 1 to the entry below entry 4, that is entries 1, 2 and 3, are moved up by one entry, while entry 4 is moved to entry 1. With the hash table 211 updated, the output counter 207 having a value of 1 indexes buffer location 0x4.

In step 810 the next transaction indexed by the output counter 207, which is that in buffer location 0x4, is issued to the local memory 150 (FIG. 1). The address of that transaction, which is again AXXXXXXX, is also stored in the issue address pipeline 217 (FIG. 2) in step 812.

This transaction issue event increments the output counter 207 in step 814 to a value of 2 in the example. Step 816 follows where the queue position register 213 is updated by pushing the value in the position of the queue position register 213 corresponding to the position of the issued transaction, which is entry 3, to the back of the queue position register 213, while the entries above the vacated position advances a single position forward. Table 709 shows the updated values in the queue position register 213.

Figure 5C:
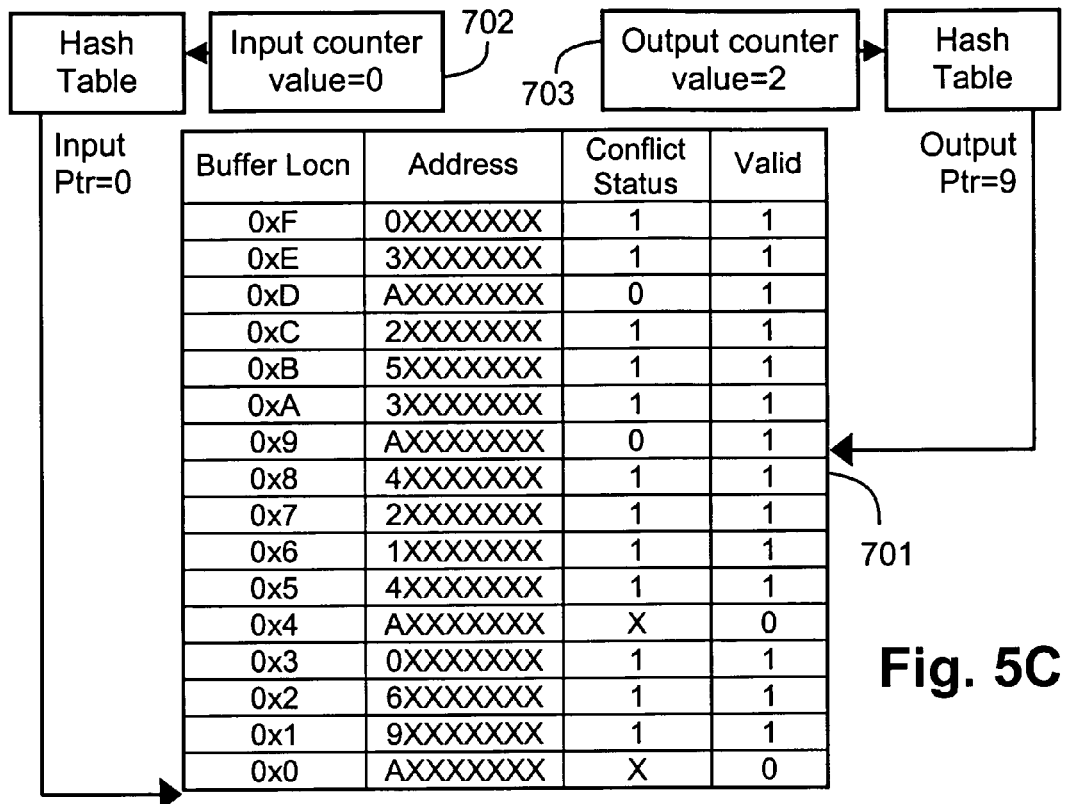
Figure 5C:
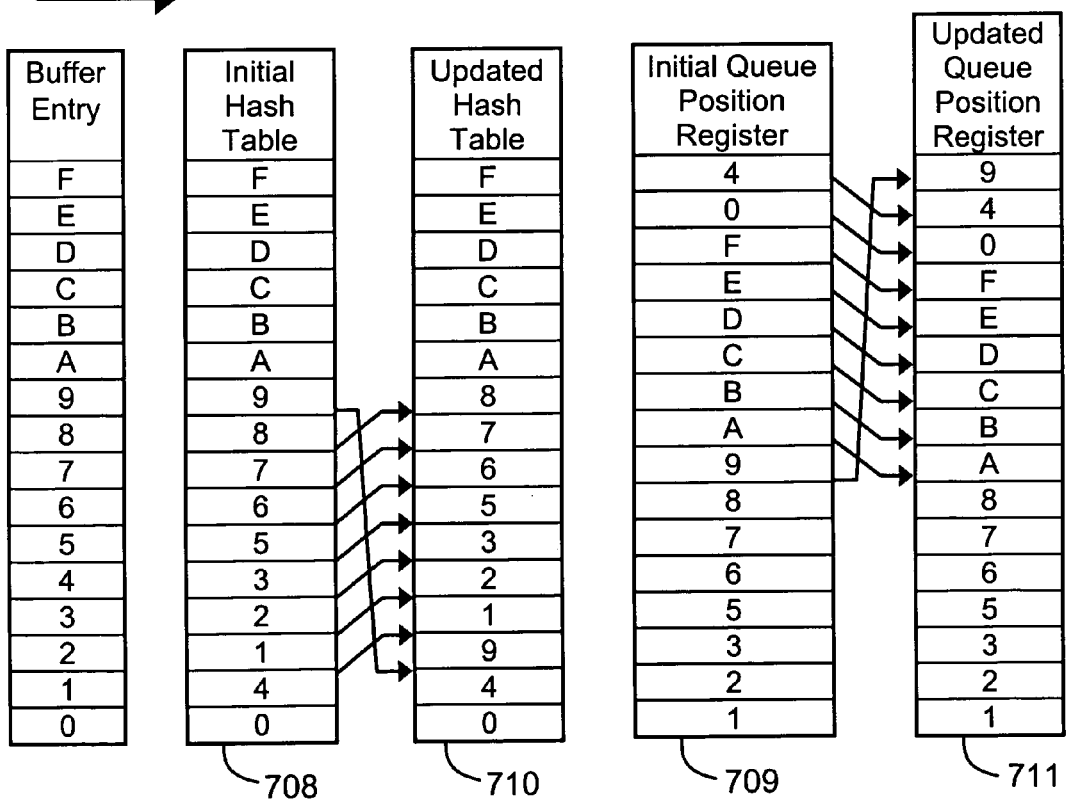

FIG. 5C depicts a scenario where yet another transaction is issued onto the re-ordered transaction stream 27. With the last issued addresses stored in the issued address pipeline 217 being AXXXXXXX, the inter-vector conflict detector circuit 215 determines that buffer locations 0x9 and 1xD contain conflict free-transactions.

In step 804 the hash table update circuit 225 (FIG. 2) determines that the entries in the initial queue position register (table 709) that point to buffer locations 0x9 and 0xD are 7 and B. The lowest location is thus determined to be 7.

As the lowest location is entry 7 in the example, which is greater than 0, the method 800 continues to step 808 where the hash table 211 is updated by the hash table update circuit 225. In the example, the initial hash table 708 is updated to form the updated hash table 710 by moving the entry which points to the location of the next conflict-free transaction, which is entry 9, to the entry pointed to by the output counter, which is entry 2 . At the same time the entries of the hash table located from the entry pointed to by the output counter to the entry below the entry which points to the location of the next conflict-free transaction up by one entry. With the hash table 211 updated, the output counter 207 having a value of 2 indexes buffer location 0x9.

In step 810 the next transaction indexed by the output counter 207, which is that in buffer location 0x9, is issued to the local memory 150 (FIG. 1). The address of that transaction, which is again AXXXXXXX, is also stored in the issue address pipeline 217 (FIG. 2) in step 812.

This transaction issue event increments the output counter 207 in step 814 to a value of 3 in the example. Step 816 follows where the queue position register 213 is updated by pushing the value in the position of the queue position register 213 corresponding to the position of the issued transaction, which is entry 7, to the back of the queue position register 213, while the entries above the vacated position advances a single position forward. Table 711 shows the updated values in the queue position register 213.

Figure 5D:
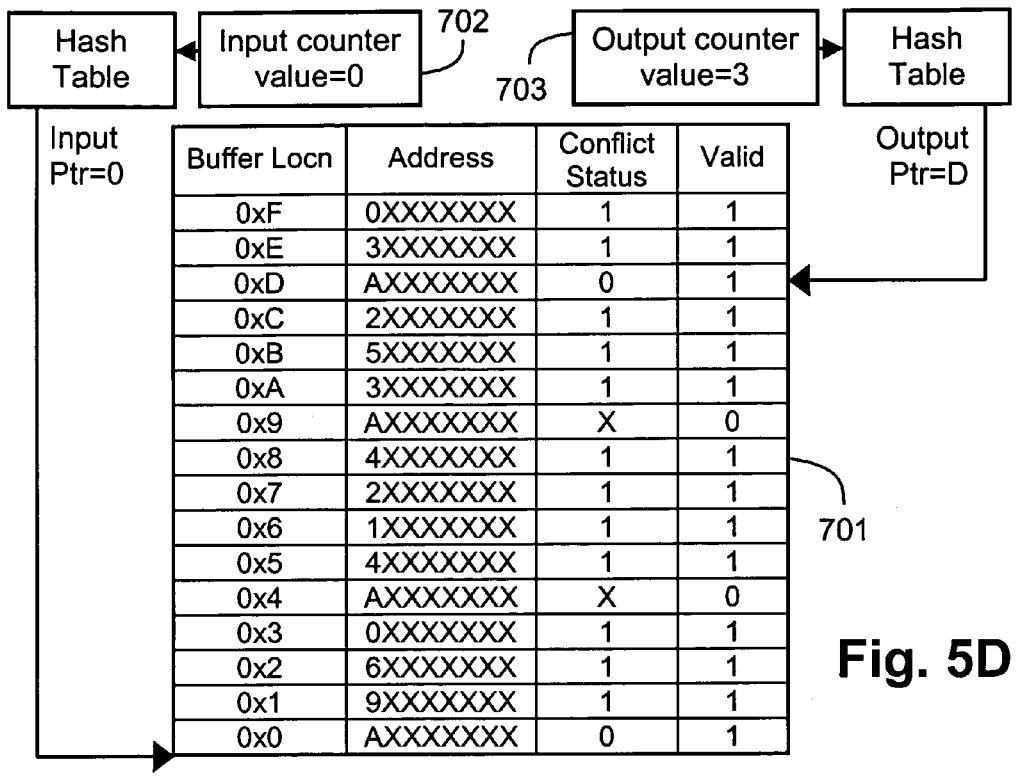
Figure 5D:
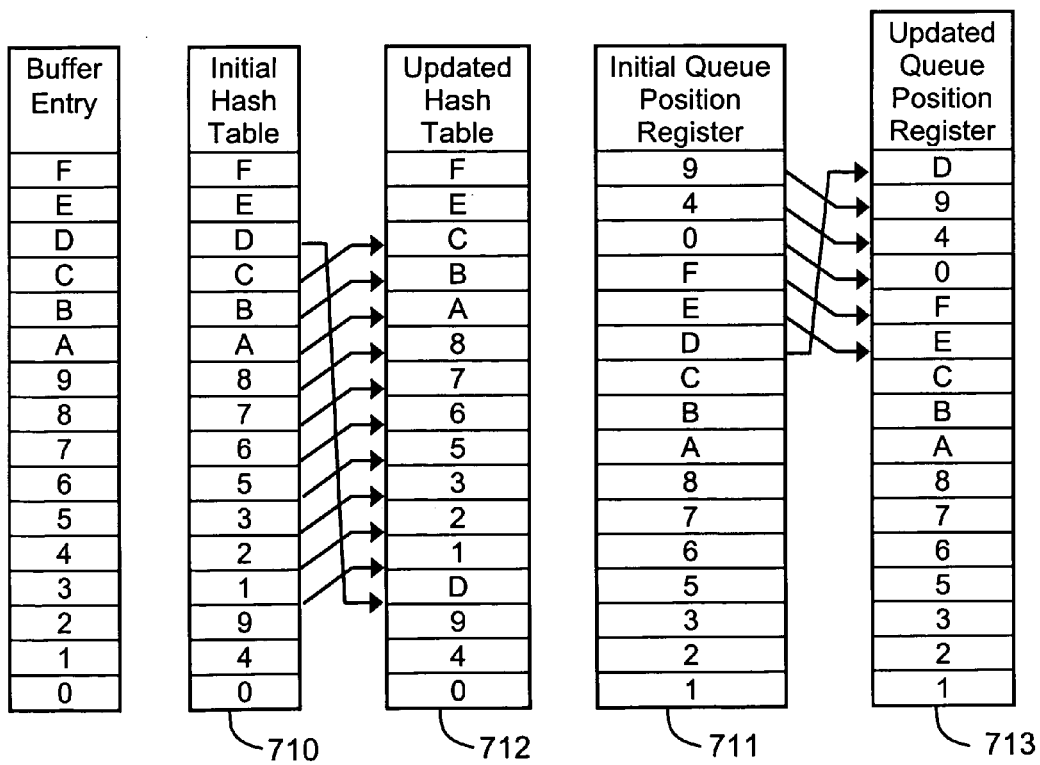

FIG. 5D depicts a scenario where a new transaction is loaded into the transaction buffer 203, followed by a transaction issue.

Starting with the loading of the new transaction and referring to method 850 (FIG. 4B) used by the second-level arbitrator 24 when loading a transaction received from the composite transaction stream 25, method 850 starts in step 852 where the new transaction is loaded into the transaction buffer 203 at the buffer location indexed by the input counter 205 through the hash table 211. In the example, the input counter value 702 is 0. The buffer location indexed by the input counter 205 though the hash table 211, the current state of which is illustrated in table 710, is buffer location 0x0. In the example the address of the new transaction is AXXXXXXX.

Method 850 ends in step 854 where the input counter 205 is incremented.

In order to issue another transaction onto the re-ordered transaction stream 27, method 800 is invoked. With the last issued addresses stored in the issued address pipeline 217 being AXXXXXXX, the inter-vector conflict detector circuit 215 determines that buffer locations 0x0 and 0xD contain conflict free-transactions. It is noted that buffer location 0x0 contains the newly loaded transaction.

In step 804 the hash table update circuit 225 determines that the entries in the initial queue position register (table 711) that point to buffer locations 0x0 and 0xD are D and A respectively. The lowest location is thus determined to be A.

The method 800 continues to step 808 where the hash table 211 is updated by the hash table update circuit 225. In the example, the initial hash table 710 is updated to form the updated hash table 712 by moving the entry which points to the location of the next conflict-free transaction, which is entry D, to the entry pointed to by the output counter, which is entry 3. At the same time the entries of the hash table located from the entry pointed to by the output counter to the entry below the entry which points to the location of the next conflict-free transaction up by one entry. With the hash table 211 updated, the output counter 207 having a value of 3 indexes buffer location 0xD.

In step 810 the next transaction indexed by the output counter 207, which is that in buffer location 0xD, is issued to the local memory 150 (FIG. 1). The address of that transaction is also stored in the issue address pipeline 217 (FIG. 2) in step 812, the output counter 207 is incremented in step 814 to a value of 4.

Step 816 follows where the queue position register 213 is updated by pushing the value in the position of the queue position register 213 corresponding to the position of the issued transaction, which is entry A, to the back of the queue position register 213, while the entries above the vacated position advances a single position forward. Table 713 shows the updated values in the queue position register 213.

Figure 5E:
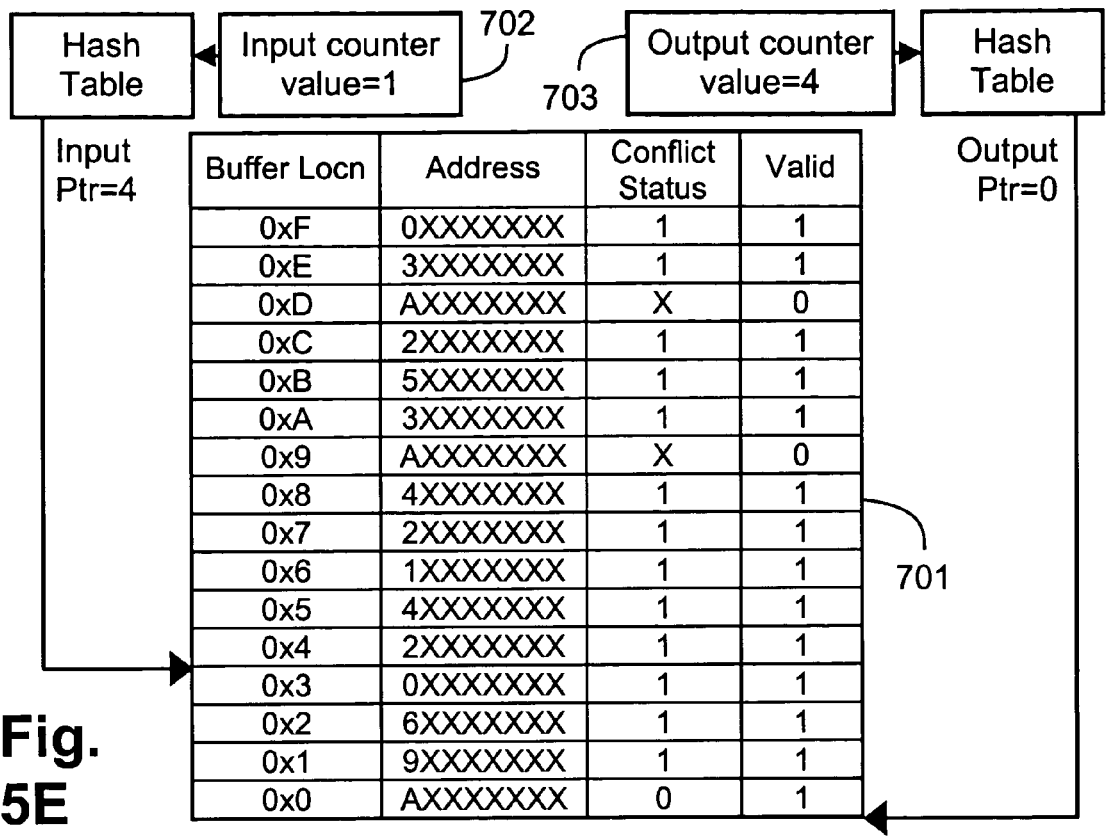
Figure 5E:
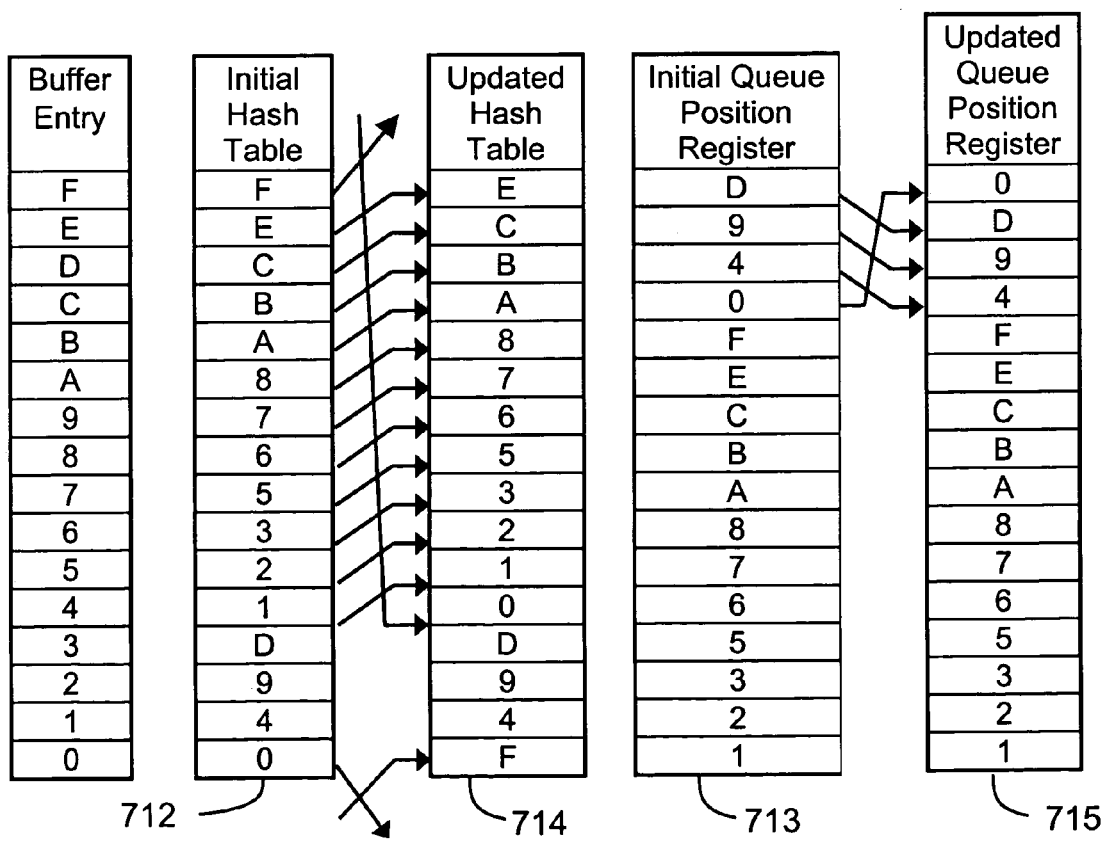

FIG. 5E depicts another scenario where a new transaction is loaded into the transaction buffer 203, followed by a transaction issue. Starting again with the loading of the new transaction, method 850 starts in step 852 where the new transaction is loaded into the transaction buffer 203 at the buffer location indexed by the input counter 205 through the hash table 211. Currently the input counter value 702 is 1, and the buffer location indexed by the input counter 205 though the hash table 211, the current state of which is illustrated in table 712, is buffer location 0x4. In the example the address of the new transaction is 2XXXXXXX. Method 850 ends in step 854 where the input counter 205 is incremented.

The transaction is issued onto the re-ordered transaction stream 27 by invoking method 800. Without discussing each step individually, the inter-vector conflict detector circuit 215 determines that only buffer locations 0x0 contains a conflict free-transaction. The entry in the initial queue position register (table 713) that point to buffer location 0x0 is C. The lowest location is thus determined to be C.

The hash table 211 is updated in step 808 by the hash table update circuit 225 to form the updated hash table 714, by moving the entry which points to the location of the next conflict-free transaction, which is entry 0, to the entry pointed to by the output counter, which is entry 4. At the same time the entries of the hash table located from the entry pointed to by the output counter to the entry below the entry which points to the location of the next conflict-free transaction up by one entry. The circular nature of the hash table 211, represented by tables 712 and 714, is evident from FIG. 5E. With the hash table 211 updated, the output counter 207 having a value of 4 indexes buffer location 0x0.

In steps 810 to 814 the next transaction indexed by the output counter 207, which is that in buffer location 0x0, is issued, the address of that transaction is stored in the issue address pipeline 217, and the output counter 207 is incremented to a value of 5.

Step 816 follows where the queue position register 213 is updated by pushing the value in the position of the queue position register 213 corresponding to the position of the issued transaction, which is entry C, to the back of the queue position register 213, while the entries above the vacated position advances a single position forward. Table 715 shows the updated values in the queue position register 213.

Figure 5F:
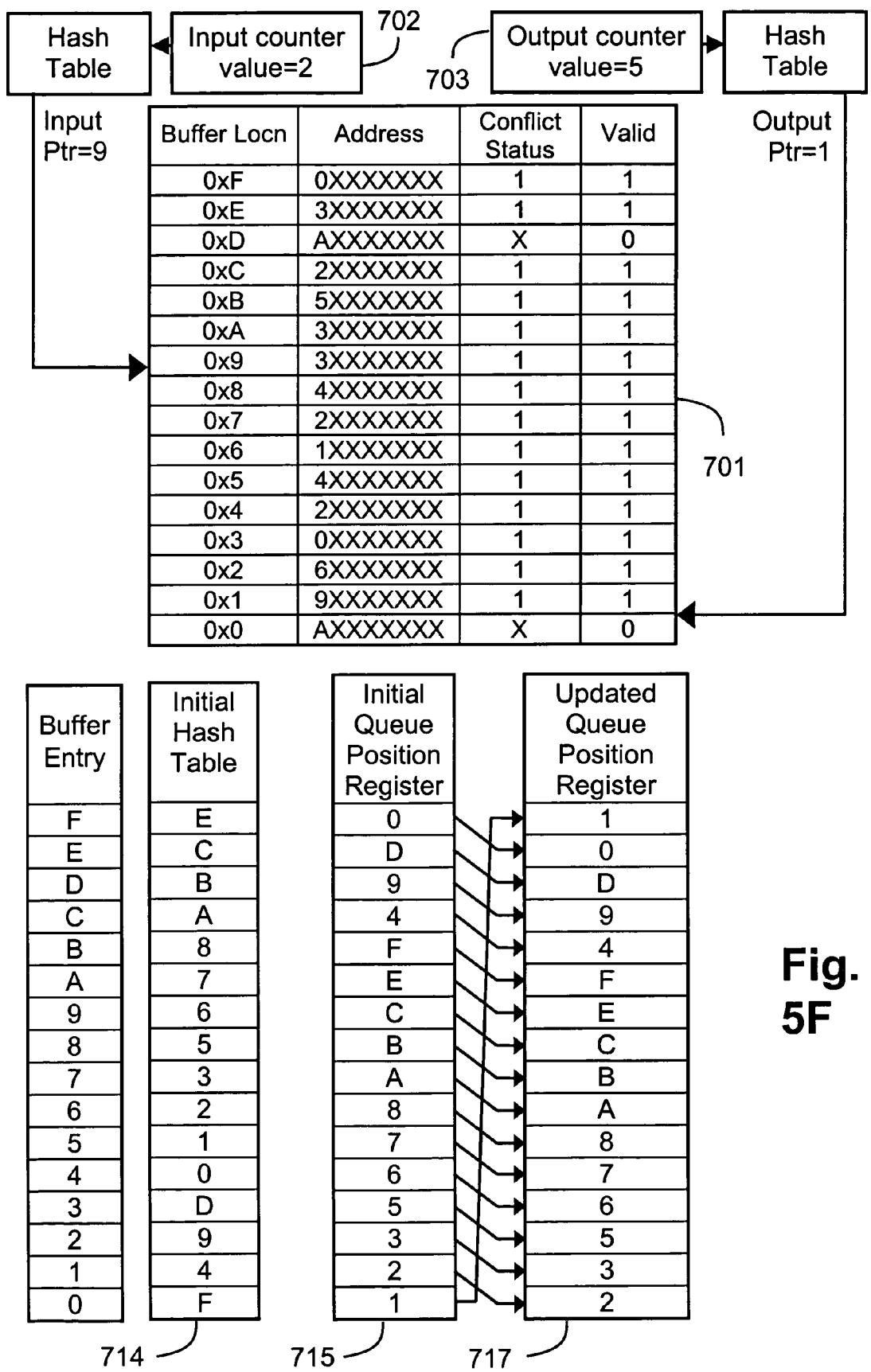

In order to also illustrate the operation of the second-level arbitrator 24 when no further conflict-free transactions exist, FIG. 5F depicts another scenario where a new transaction is loaded into the transaction buffer 203, followed by a transaction issue. Starting again with the loading of the new transaction, method 850 starts in step 852 where the new transaction is loaded into the transaction buffer 203 at the buffer location indexed by the input counter 205 through the hash table 211. Currently the input counter value 702 is 2, and the buffer location indexed by the input counter 205 though the hash table 211, the current state of which is illustrated in table 714, is buffer location 0x9. In the example the address of the new transaction is 3XXXXXXX. Method 850 ends in step 854 where the input counter 205 is incremented.

The transaction is issued onto the re-ordered transaction stream 27 by again invoking method 800. Without discussing each step individually, the inter-vector conflict detector circuit 215 determines that no valid conflict free-transactions exist.

As no conflict-free transactions exist, the smallest location is set to 0, no re-ordering is required and the method 800 continues to step 810 where the transaction indexed by the output counter 207, which is that in buffer location 0x1, is issued. It is noted that buffer location contains the oldest transaction in the transaction buffer 203. Hence, the order in which the transaction buffer 203 is unloaded is: starting with the oldest conflict-free transactions, until all conflict-free transactions are issued, then next the oldest remaining transaction in the transaction buffer.

In steps 812 and 814 the address of that transaction is stored in the issue address pipeline 217, and the output counter 207 is incremented to a value of 6. Step 816 follows where the queue position register 213 is updated by pushing the value in the position of the queue position register 213 corresponding to the position of the issued transaction, which is entry 0, to the back of the queue position register 213, while the entries above the vacated position advances a single position forward. Table 717 shows the updated values in the queue position register 213.

Having described the operation of the second-level arbitrator 24 in detail with reference to the example illustrated in FIGS. 5A to 5F, Table 1 shows another open-page example. The transaction buffer 203 (FIG. 2) holds 16 entries including the sub-unit of memory of the address the transactions point to. In the usual case where the transactions are passed from the first-level arbitrator 22 (FIG. 1) to the local memory 150 (FIG. 1), which corresponds with first-in-first-out (FIFO) order, then a total of 13 conflicts would occur. For example, referring to entry 2 which contains a transaction in memory sub-unit 8, a conflict will be detected between that transaction and the previous transaction, as the previous transaction, that is entry 1, contains a transaction in a different memory sub-unit. The composite transaction stream 25 received from the first-level arbitrator 22 thus includes transactions in an order which will cause 13 memory conflicts. Using the second-level arbitrator 24 to reorder those 16 transactions to thereby issue those transactions in the optimised order illustrated, the memory conflicts are reduced to only 6.

TABLE 1

Open-Page access re-ordering example.

| Buffer Entry (FIFO-order) | Conflicts in incoming composite stream | Page Address | Buffer Entry (Open Page Optimised-Order) | Conflicts in outgoing stream | Re-ordered Page Addresses |
|---|---|---|---|---|---|
| 0 |  | 3XXXXXXX | 0 |  | 3XXXXXXX |
| 1 |  | 3XXXXXXX | 1 |  | 3XXXXXXX |
| 2 | Conflict → | 8XXXXXXX | 5 |  | 3XXXXXXX |
| 3 | Conflict → | 7XXXXXXX | B |  | 3XXXXXXX |
| 4 | Conflict → | 2XXXXXXX | E |  | 3XXXXXXX |
| 5 | Conflict → | 3XXXXXXX | 2 | Conflict → | 8XXXXXXX |
| 6 | Conflict → | 0XXXXXXX | 8 |  | 8XXXXXXX |
| 7 |  | 0XXXXXXX | D |  | 8XXXXXXX |
| 8 | Conflict → | 8XXXXXXX | 3 | Conflict → | 7XXXXXXX |
| 9 | Conflict → | 9XXXXXXX | C |  | 7XXXXXXX |
| A | Conflict → | AXXXXXXX | F |  | 7XXXXXXX |
| B | Conflict → | 3XXXXXXX | 4 | Conflict → | 2XXXXXXX |
| C | Conflict → | 7XXXXXXX | 6 | Conflict → | 0XXXXXXX |
| D | Conflict → | 8XXXXXXX | 7 |  | 0XXXXXXX |
| E | Conflict → | 3XXXXXXX | 9 | Conflict → | 9XXXXXXX |
| F | Conflict → | 7XXXXXXX | A | Conflict → | AXXXXXXX |

Table 2 shows a closed-page example. With a four-stage pipeline access, the composite transaction stream 25 received from the first-level arbitrator 22 includes transactions in an order which will cause 4 memory conflicts. For example, referring to entry 1 which contains a transaction in memory sub-unit 3, a conflict is detected because the previous transaction was also to memory sub-unit 3. Similarly, the transaction in entry E causes a conflict, as one of the previous 3 transactions was also to memory sub-unit 3. Table 2 also shows those transactions re-ordered in a closed-page optimised order. The four-stage pipeline content is also illustrated. In the re-ordered transactions, only one conflict occurs. That is when the transaction in buffer entry E is passed to the local memory 150, because another transaction of the last three transactions also accessed memory sub-unit 3.

by accesses to vector_A crosses a page boundary that causes vector_A to be accessed out-of-order. Accordingly, the second level-arbitrator 24 detects these situations and suppresses the reordering to avoid data corruption.

TABLE 2

Closed-Page, four-stage pipeline access re-ordering example.

| Buffer Entry (FIFO-order) | Conflicts in incoming composite stream | Page Address | Buffer Entry (Closed Page Optimised-Order) | Pipeline Contents | Conflicts in outgoing composite stream | Re-ordered Page Addresses |
|---|---|---|---|---|---|---|
| 0 |  | 3XXXXXXX | 0 | XXX3 |  | 3XXXXXXX |
| 1 | Conflict → | 3XXXXXXX | 2 | XX38 |  | 8XXXXXXX |
| 2 |  | 8XXXXXXX | 3 | X387 |  | 7XXXXXXX |
| 3 |  | 7XXXXXXX | 4 | 3872 |  | 2XXXXXXX |
| 4 |  | 2XXXXXXX | 1 | 8723 |  | 3XXXXXXX |
| 5 |  | 3XXXXXXX | 6 | 7230 |  | 0XXXXXXX |
| 6 |  | 0XXXXXXX | 8 | 2308 |  | 8XXXXXXX |
| 7 | Conflict → | 0XXXXXXX | 9 | 3089 |  | 9XXXXXXX |
| 8 |  | 8XXXXXXX | 5 | 0893 |  | 3XXXXXXX |
| 9 |  | 9XXXXXXX | 7 | 8930 |  | 0XXXXXXX |
| A |  | AXXXXXXX | A | 930A |  | AXXXXXXX |
| B |  | 3XXXXXXX | C | 30A7 |  | 7XXXXXXX |
| C |  | 7XXXXXXX | B | 0A73 |  | 3XXXXXXX |
| D |  | 8XXXXXXX | D | A738 |  | 8XXXXXXX |
| E | Conflict → | 3XXXXXXX | E | 7383 | Conflict → | 3XXXXXXX |
| F | Conflict → | 7XXXXXXX | F | 3837 |  | 7XXXXXXX |

The operation of the intra-vector conflict detector circuit 219 (FIG. 2) will now be described in more detail. When the second-level arbitrator 24, and in particular the hash table update circuit 225 re-orders the transactions, the transactions must be re-ordered by modifying the interleaving of separate streams. The temporal ordering in intra-stream requests must be preserved. Since the transaction vectors will commonly span conflict boundaries, the circuit 225 must not re-order intra-stream requests at boundary crossings. Table 3 provides an example of an incorrect operation, whereas Table 4 shows how the second-level arbitrator 24 should operate.

TABLE 3

Incorrect operation resulting in intra-vector reordering caused by a vector crossing a conflict boundary (open-page mode).

| Buffer Entry (FIFO-order) | Page Address (FIFO-order) | Request ID (FIFO-order) | Re-ordered Page Addresses | Request ID (FIFO-order) |
|---|---|---|---|---|
| 0 | 4 | Vector_A(1) | 4 | Vector_A(1) |
| 1 | 3 | Vector_B(1) | 4 | Vector_A(3) |
| 2 | 3 | Vector_A(2) | 4 | Vector_A(4) |
| 3 | 4 | Vector_A(3) | 4 | Vector_B(2) |
| 4 | 4 | Vector_A(4) | 3 | Vector_B(1) |
| 5 | 4 | Vector_B(2) | 3 | Vector_A(2) |
| 6 | 3 | Vector_C(1) | 3 | Vector_C(1) |

Table 3 shows a transaction buffer with 7 pending transactions. There are three request sources giving rise to transactions to/from three vectors (vector_A, vector_B, and vector_C). The re-ordered transaction stream 27 generated

TABLE 4

Correct operation of the above example where intra-vector reordering is avoided

| Buffer Entry (FIFO-order) | Page Address (FIFO-order) | Request ID (FIFO-order) | Re-ordered Page Addresses | Request ID (FIFO-order) |
|---|---|---|---|---|
| 0 | 4 | Vector_A(1) | 4 | Vector_A(1) |
| 1 | 3 | Vector_B(1) | 3 | Vector_A(2) |
| 2 | 3 | Vector_A(2) | 3 | Vector_B(1) |
| 3 | 4 | Vector_A(3) | 3 | Vector_C(1) |
| 4 | 4 | Vector_A(4) | 4 | Vector_A(3) |
| 5 | 4 | Vector_B(2) | 4 | Vector_A(4) |
| 6 | 3 | Vector_C(1) | 4 | Vector_B(2) |

In the example shown in Table 4, after servicing the transaction in buffer entry 0, the second-level arbitration 24 detects the next conflict-free entry is at buffer entry 3. However, the hash table update circuit 225 detects that the interval between entry 0 and entry 3 contains out-of-order transactions. This causes the re-ordering to be suppressed for that cycle and therefore entry 1 (the next entry in first-level arbitrated-order) is the next entry to be serviced. In the two transactions that follows, transactions accessing memory sub-unit 3 are processed first to avoid further conflict, before the remainder of the memory sub-unit 4 transactions are serviced.

Figure 6:
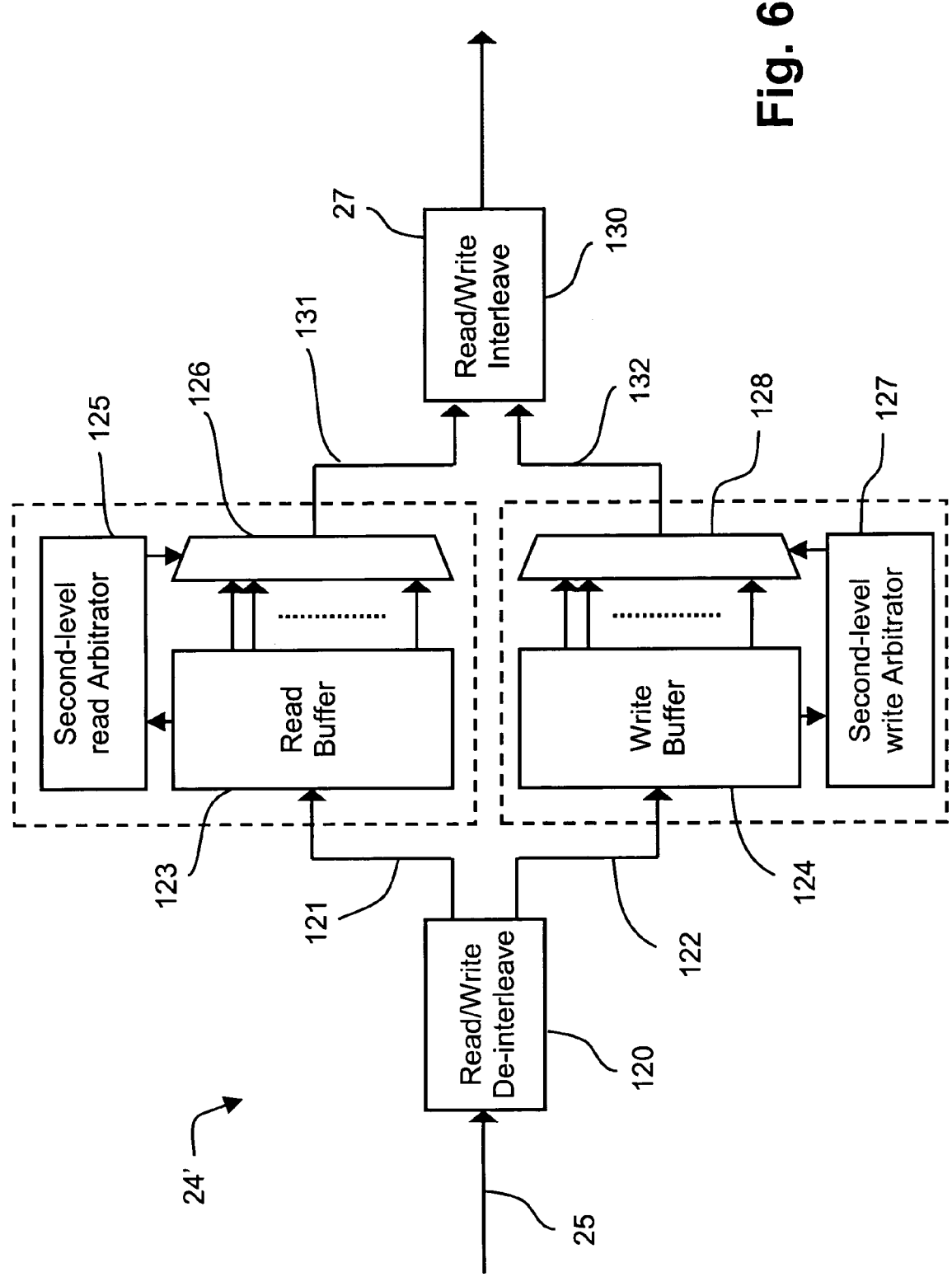
FIG. 6 shows an alternative implementation of the second-level arbitrator.

FIG. 6 shows an alternative implementation of the second-level arbitrator 24'. In this implementation the composite transaction stream 25 from the first-level arbitrator 22 is separated into a read transaction stream 121 and a write transaction stream 122 by a read/write de-interleave 120. The transactions of the read and write transaction streams 121 and 122 are also buffered separately in read and write buffers 123 and 124 respectively.

A second-level read arbitrator 125 performs the second arbitration algorithm on the transactions in the read buffer 123, allowing a read multiplexer 126 to dynamically select read transactions with reduced conflict instances, those transactions being passed to a read/write interleave 130. Hence, the function of the read buffer 123 is to provide the second-level read arbitrator 125 concurrent access to a window in the read transaction stream 121. The transactions within the window are analyzed by the second-level arbitrator 125 and the first-level arbitration-order of the transactions is adjusted as necessary to minimise memory resource conflict occurrences, thereby generating a read transaction stream 131 in second-level arbitration order.

Similar to the second-level read arbitrator 125, a second-level write arbitrator 127 also performs the second arbitration algorithm on the write transactions in the write buffer 124. A write multiplexer 128 selects those transactions in a re-ordered sequence to form a write transaction stream 132 in second-level arbitration order, before passing them to the read/write interleave 130.

The read/write interleave 130 interleaves the re-ordered read and write transaction streams into a single composite transaction stream 27 which is passed to the local memory 150 (FIG. 1).

The dual buffer implementation described in FIG. 6 has the added advantage that read/write turnaround frequency can be minimised. This in turn minimises any performance penalty associated with read/write turnaround.

In this implementation, the read buffer 123, the multiplexer 126 and the second-level read arbitrator 125 are constructed and perform the functions as set out in relation to FIG. 2. In a similar manner, the write buffer 124, the multiplexer 128 and the second-level write arbitrator 127 are also constructed as set out in FIG. 2.

The foregoing describes only some embodiments of the present invention, and modifications and/or changes can be made thereto without departing from the scope and spirit of the invention.

In the context of this specification, the word "comprising" means "including principally but not necessarily solely" or "having" or "including" and not "consisting only of". Variations of the word comprising, such as "comprise" and "comprises" have corresponding meanings.

I claim:

1. An arbitrator for reordering access requests to a memory system to reduce memory system conflicts, said arbitrator comprising:
    a transaction buffer for buffering said access requests;
    an input counter for counting access requests received by said arbitrator;
    an output counter for counting access requests issued by said arbitrator;
    a mapping table for mapping said input counter and said output counter to respective locations in said transaction buffer; and
    a reordering unit for dynamically re-ordering entries in said mapping table such that the mapping of said output counter points to said access requests in an issue order wherein memory system conflicts are reduced, wherein the mapping of said input counter maps to the location in said transaction buffer that is to be filled by a next received access request, and wherein said locations in said transaction buffer are filled in the order that access requests issued from said locations.

2. The arbitrator as claimed in claim 1, wherein said mapping table is a hash table.

3. An arbitrator for reordering access requests to a memory system to reduce memory system conflicts, said arbitrator comprising:
    a transaction buffer for buffering said access requests;
    an output counter for counting access requests issued by said arbitrator;
    a mapping table for mapping at least output counter values to locations in said transaction buffer; and
    a reordering unit for dynamically re-ordering entries in said mapping table such that the mapping of said output counter points to said access requests in an issue order wherein memory system conflicts are reduced, wherein said reordering unit comprises:
    a conflict detector circuit for detecting memory system conflicts between one or more issued access requests and said access requests in said transaction buffer;
    a selection means unit for selecting a next conflict-free access request in input order; and
    a mapping table update circuit for re-ordering said entries in said mapping table based on said next conflict-free access request in input order.

4. The arbitrator as claimed in claim 3, wherein said arbitrator further comprises:
    a queue position register for recording said input order.

5. An arbitration method of reordering access requests to a memory system to reduce memory system conflicts, said method comprising:
    (a) buffering said access requests in a transaction buffer;
    (b) maintaining a mapping table, said mapping table mapping an input counter and an output counter to locations in said transaction buffer;
    (c) dynamically re-ordering entries in said mapping table such that said mapping of said output counter points to said access requests in an issue order wherein memory system conflicts are reduced;
    (d) counting access requests received by said arbitrator using said input counter; and
    (e) placing a next received access request in said transaction buffer at a buffer location pointed to by the mapping of said input counter.

6. The arbitration method as claimed in claim 5, wherein said mapping table is a hash table.

7. An arbitration method for reordering access requests to a memory system to reduce memory system conflicts, said method comprising:
    (a) buffering said access requests in a transaction buffer;
    (b) maintaining a mapping table, said mapping table mapping at least an output counter to locations in said transaction buffer; and
    (c) dynamically re-ordering entries in said mapping table such that said mapping of said output counter points to said access requests in an issue order wherein memory system conflicts are reduced; wherein step (c) comprises the sub-steps of:
    (c1) detecting memory system conflicts between one or more issued access requests and said access requests in said transaction buffer;
    (c2) selecting a next conflict-free access request in input order; and
    (c3) re-ordering said entries in said mapping table based on said next conflict-free access request in input order.

8. The method as claimed in claim 7, wherein said method comprises the further steps of:
    (d) maintaining a queue position register, said queue position register recording said input order.

* * * * *